United States Patent [19]
Hunkert

[11] Patent Number: 6,050,916
[45] Date of Patent: Apr. 18, 2000

[54] TOOTHED BELT OR CHAIN DRIVE ARRANGEMENT HAVING A TOOTH WITH DIFFERENT FLANK GEOMETRY FROM OTHER TEETH

[75] Inventor: Steffen Hunkert, Wolfsburg, Germany

[73] Assignee: Volkswagen AG, Wolfsburg, Germany

[21] Appl. No.: 09/306,320

[22] Filed: May 6, 1999

Related U.S. Application Data

[63] Continuation of application No. PCT/EP97/06110, Nov. 5, 1997.

[30] Foreign Application Priority Data

Nov. 22, 1996 [DE] Germany ............................ 198 48 378

[51] Int. Cl.[7] ................................. F16H 7/02; F16G 1/28
[52] U.S. Cl. ............................................. 474/153; 474/204
[58] Field of Search .................................... 474/152, 153, 474/154, 155, 202, 203, 204, 205, 206

[56] References Cited

U.S. PATENT DOCUMENTS

| | | |
|---|---|---|
| 3,377,875 | 4/1968 | Sand ........................................... 474/94 |
| 3,738,187 | 6/1973 | Hisserich ................................. 474/148 |
| 4,840,608 | 6/1989 | Araki et al. .............................. 474/205 |
| 5,015,218 | 5/1991 | Macchiarulo et al. .................. 474/152 |
| 5,140,344 | 8/1992 | Tsukada et al. ...................... 346/139 R |
| 5,145,188 | 9/1992 | Bartelt et al. ............................ 474/153 |
| 5,267,910 | 12/1993 | Maruyama et al. .................... 474/212 |
| 5,358,453 | 10/1994 | Kimura et al. .......................... 474/153 |
| 5,759,124 | 6/1998 | Sung ....................................... 474/152 |
| 5,782,712 | 7/1998 | Campagnolo ........................... 474/152 |
| 5,876,296 | 3/1999 | Hsu et al. ................................ 474/152 |
| 5,921,879 | 7/1999 | Young ..................................... 474/202 |

FOREIGN PATENT DOCUMENTS

| | | |
|---|---|---|
| 4331482 | 9/1993 | Germany . |
| 59-217046 | 12/1984 | Japan . |
| 2094439 | 3/1981 | United Kingdom . |

*Primary Examiner*—David A. Bucci
*Assistant Examiner*—Matthew A. Kaness
*Attorney, Agent, or Firm*—Baker Botts L.L.P.

[57] ABSTRACT

A toothed belt drive or chain drive has at least one toothed gear wheel and at least one toothed belt or chain. At least one tooth of the toothed gear wheel and/or at least one tooth of the toothed belt or at least one link of the chain has a flank geometry which is different from that of each of the other teeth.

19 Claims, 3 Drawing Sheets

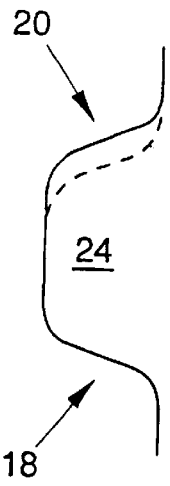 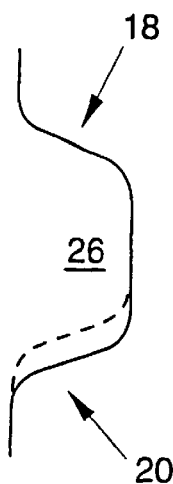
FIG. 3a　　　　　　　FIG. 3b
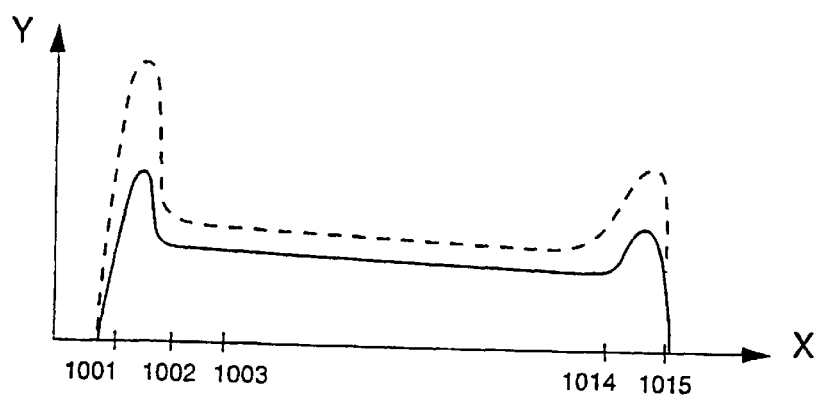
FIG. 4a
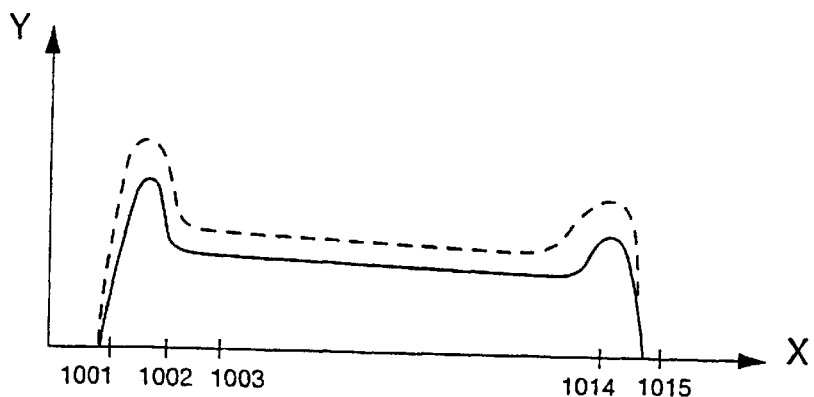
FIG. 4b

TOOTHED BELT OR CHAIN DRIVE ARRANGEMENT HAVING A TOOTH WITH DIFFERENT FLANK GEOMETRY FROM OTHER TEETH

REFERENCE TO RELATED APPLICATION

This application is a continuation of International Application No. PCT/EP97/06110 filed Nov. 5, 1997.

GROUND OF THE INVENTION

This invention relates to toothed belt or chain drive arrangements having at least one toothed gear wheel and at least one belt or chain having tooth members. As used herein "tooth member" includes both a tooth on a gear wheel or on a toothed belt and a link in a chain which engages a tooth on a toothed gear wheel.

U.S. Pat. No. 4,840,608 describes a toothed belt with teeth having a cross section with convex curves in a cycloidal shape for the purpose of improving the load properties of a toothed belt drive. Cyclically repeated peak loads, such as occur for example in camshaft drives at the moment of fuel ignition in a corresponding working cylinder, cause premature wear and damage to a toothed drive belt. Varying loads applied to a toothed belt drive, especially with short load peaks, result in localized overloads, for which allowance can be made only by designing the entire belt to withstand the maximum peak load regardless of how often or at what time intervals the peak load occurs. Thus, toothed belt drives become expensive and frequently are oversized for 95% or more of their operating time and/or operating cycle or else they must be replaced prematurely.

For reducing or avoiding belt or chain noise in the operation of a roller chain drive or a toothed belt drive, German Patent Publications Nos. 43 31 482 and 29 06 619 and British Patent Publication No. 2,094,439 describe arrangements in which an irregular tooth distribution is provided in a toothed gear wheel and, correspondingly, an irregular chain link distribution is provided in a chain. However, the problem of short-lived peak loads cannot be avoided by such arrangements, since the load applied to the toothed belt varies for reasons other than nonuniform distribution of teeth.

SUMMARY OF THE INVENTION

Accordingly, it is an object of the present invention to provide a toothed belt or chain drive arrangement which overcomes disadvantages of the prior art. Another object of the invention is to provide a toothed belt or chain drive arrangement in which loading capacity and service life are improved.

These and other objects of the invention are attained by providing a toothed gear wheel having tooth members and a belt or chain having tooth members which engage the tooth members of the toothed gear wheel wherein at least one tooth member of the toothed gear wheel and/or at least one tooth member of the belt or chain, referred to herein as a "different" tooth member, has a flank geometry which differs from the flank geometry of each of the other tooth members. This permits the individual tooth members of the belt drive to be designed so that load peaks do not additionally stress the toothed belt or chain. Therefore, belt or chain loading is reduced, particularly for very highly loaded drive arrangements.

Especially effective load relief from load peaks is obtained if the flank geometry of the different tooth member is asymmetrical with regard to its front and rear flanks. A particularly simple design is made possible if the different tooth member has a steeper or a flatter flank geometry or has a greater or a smaller head radius or has a greater or a smaller foot radius than the other tooth members.

In a preferred embodiment, the position of the different tooth member is arranged so that the different tooth member, at the moment of a load peak, is in an engagement position between the toothed gear wheel and the toothed belt or the chain. In a particularly preferred arrangement, the different tooth member, at the moment of a load peak, is at the run-in position or run-out position of engagement with a toothed gear wheel or at the run-in position or run-out position of engagement with a toothed belt or chain. This achieves optimal load-relief effect between the belt or chain and the gear wheel.

In an arrangement in which at least two tooth members on a chain or a belt have a flank geometry differing from that of other tooth members, the different tooth members are positioned so that, at the moment of a load peak, they both are at a run-in position and/or a run-out position of engagement with at least one toothed gear wheel, or in which at least two tooth members of a toothed gear wheel having a flank geometry which differs from that of the tooth members, the different tooth members are positioned so that, at the moment of a load peak, they are both at a run-in position and/or a run-out position of engagement with a toothed belt or chain, thereby further improving load relief for the belt or chain.

In another advantageous arrangement, individually adapted tooth flank geometry for selected different tooth members may be provided on a driving gear wheel as well as on a driven gear wheel or at appropriate locations on a belt or chain connecting a driving gear wheel and a driven gear wheel. In a belt drive between, for example, a crankshaft and a camshaft in a motor vehicle, three tooth members on, for example, the driving gear wheel as well as three tooth members on the driven gear wheel may have an individual flank geometry which is designed so that elongation of the toothed belt resulting from uneven activation and the associated pitch errors are compensated. Pitch errors may be reduced by providing these diverse tooth flank geometries, and may decrease to zero as a function of elongation.

The toothed belt or chain drive arrangement according to the invention is especially advantageous for use in driving a pump-nozzle direct fuel injection system or a high-pressure pump for common-rail high-pressure fuel injection of a drive engine, in particular of a motor vehicle.

BRIEF DESCRIPTION OF THE DRAWINGS

Further objects and advantages of the invention will be apparent from a reading of the following description in conjunction with the accompanying drawings, in which;

FIGS. 3a and 3b are enlarged views showing shapes of a tooth member of the toothed gear wheel in each of the regions A and B of FIG. 2; and FIGS. 4a and 4b are schematic graphical representations showing the relative loads applied to the tooth members of the toothed gear wheels of FIG. 1 and FIG. 2 respectively.

DESCRIPTION OF THE PREFERRED EMBODIMENTS

Figure 1:
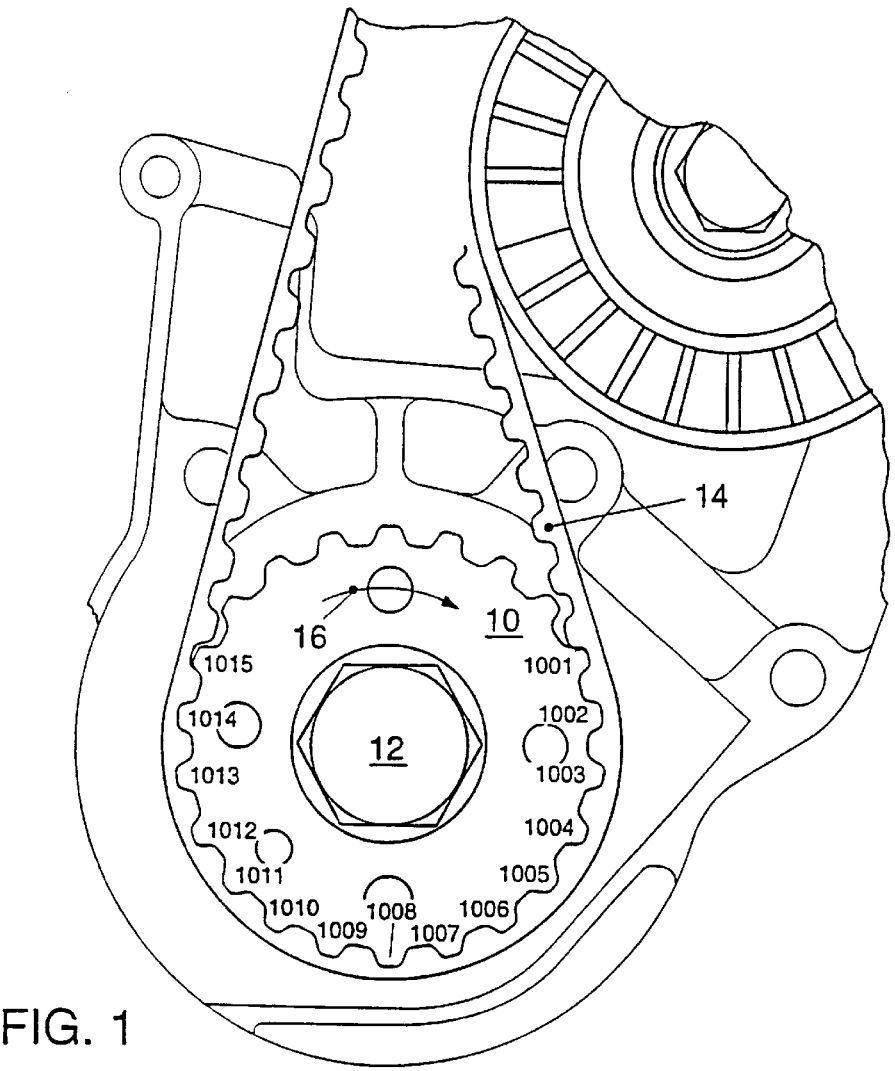
FIG. 1 is a schematic sectional view illustrating a conventional toothed belt drive arrangement.

FIG. 1 illustrates a conventional toothed belt drive arrangement having a toothed belt 14 which meshes with consecutive tooth members of a toothed gear wheel 10 located at positions designated 1001 to 1015. In the illustrated example, the gearwheel 10 is driven by a crankshaft 12 of an internal combustion engine and drives a camshaft, not shown, through the toothed belt 14. An arrow 16 indicates the direction of rotation of the gearwheel 10.

The tooth member at the position designated 1001 is located at the run-in position where the belt first engages the toothed wheel and the tooth member at the position designated 1015 is located at the run-out position where the belt 14 last engages the toothed gear wheel 10.

Figure 2:
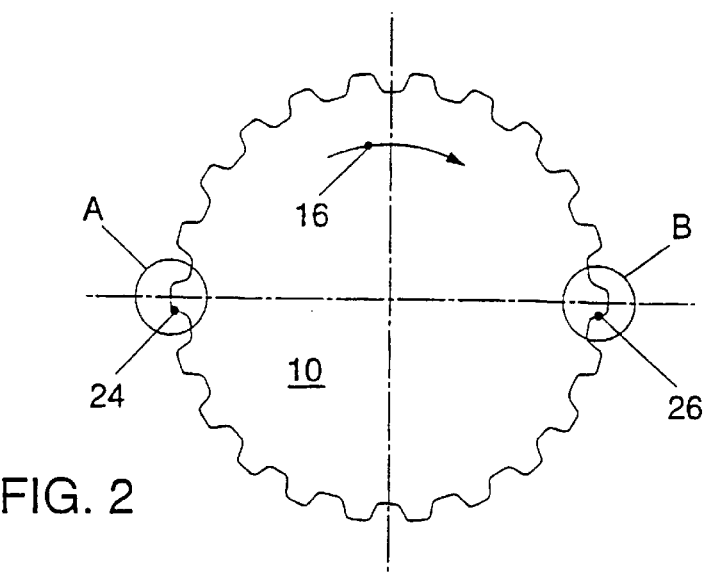
FIG. 2 is a schematic view illustrating the arrangement of a preferred representative embodiment of a toothed gear wheel according to the present invention.

FIG. 2 shows an advantageous embodiment of a toothed gear wheel 10, and FIGS. 3a and 3b are enlarged views of regions A and B respectively of FIG. 2 which illustrate the front and rear flank geometry of the tooth members of the gear wheel. The broken lines in FIGS. 3a and 3b represent the flank geometry of two flanks 18 and 20 of two different tooth members 24 and 26 and the solid line shows the flank geometry of the other tooth members of the gear wheel. Because the front and rear flanks 18 and 20 of the tooth members 24 and 26 have different geometries, reduced loads are produced at the run-in position and at the run-out position of engagement and disengagement between the gear wheel 10 and a toothed belt, which is not shown in FIGS. 3a and 3b. In other words, the tooth members 24 and 26 have asymmetrical flank geometry.

The locations of the different tooth members 24 and 26 on the gear wheel are selected so that they are located precisely in the positions illustrated in FIG. 2 when a load peak occurs due to ignition of fuel in a corresponding working cylinder of the internal combustion engine.

FIGS. 4a and 4b illustrate the relative forces applied to the flanks of the tooth members at the positions 1001 to 1015 of the gear wheel 10. In these graphical representations, the tooth members at the positions 1001 to 1015 are plotted on the x axis and the flank force on those tooth members is plotted on the y axis. The solid line illustrates the flank forces for normal loading and the broken line illustrates the flank forces during load peaks.

FIG. 4a shows the flank forces on the tooth members of a conventional toothed gear wheel, while FIG. 4b illustrates the flank forces on the tooth members of a toothed gear wheel 10 according to the invention. A comparison of these illustrations demonstrates that, in the region of flank force peaks in the tooth members at the positions 1001 and 1015, the load on the tooth members in a gear wheel 10 according to the invention is smaller than that on a conventional gear wheel. This reduced load causes less wear of the belt 14 or of the gear wheel 10 and results in longer service life of the toothed belt drive.

Which tooth members are provided with a varied flank geometry and how this varied geometry is arranged depends upon the particular use of the toothed belt drive or chain drive. For example, it may be appropriate to provide the different tooth members in a drive for a 4-cylinder internal combustion engine at locations which are different from those for a 5-cylinder engine.

Depending upon whether the different tooth member or members are located on the toothed gear wheel 10 and/or the toothed belt 14 or chain, the gear wheel 10 or the belt 14 or the chain should be mounted in a precisely predefined position so that, during operation of the internal combustion engine, the varied flank geometry of a different tooth member always comes to bear on the crankshaft gear wheel 10 at the correct time, i.e., at the time of load peaks caused by fuel ignition in the corresponding cylinder. Either specific individual tooth members or all tooth members of the toothed gear wheel 10 may be shaped with an optimum flank geometry which depends on the load applied at the time the tooth member is engaged. When the variation in applied load over the periphery of toothed belt 14 or toothed gear wheel 10 during operation is known, the flank geometries can be varied correspondingly along the course of toothed belt 14 or the toothed gear wheel 10. In an extreme case, every tooth member has a different flank geometry.

Figure 6:
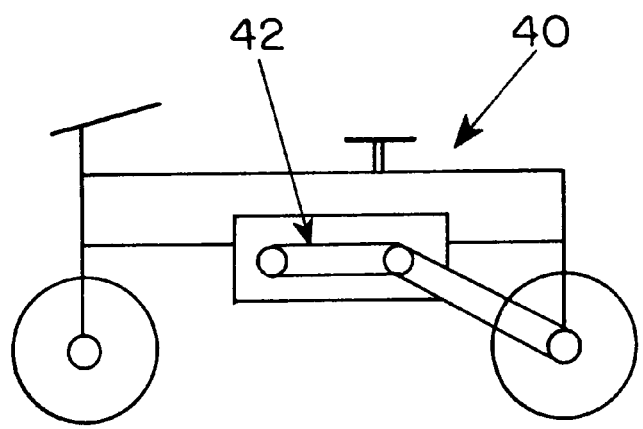

It will be further understood that the invention is not limited to drive systems of the specific type represented in FIG. 1. Motor vehicle or other transmission systems as well as bicycle drives in a bicycle 40 schematically shown in FIG. 6 may develop load peaks which can be correspondingly balanced by providing a toothed drive arrangement 42 having tooth members with varied geometry according to the invention.

Figure 5:
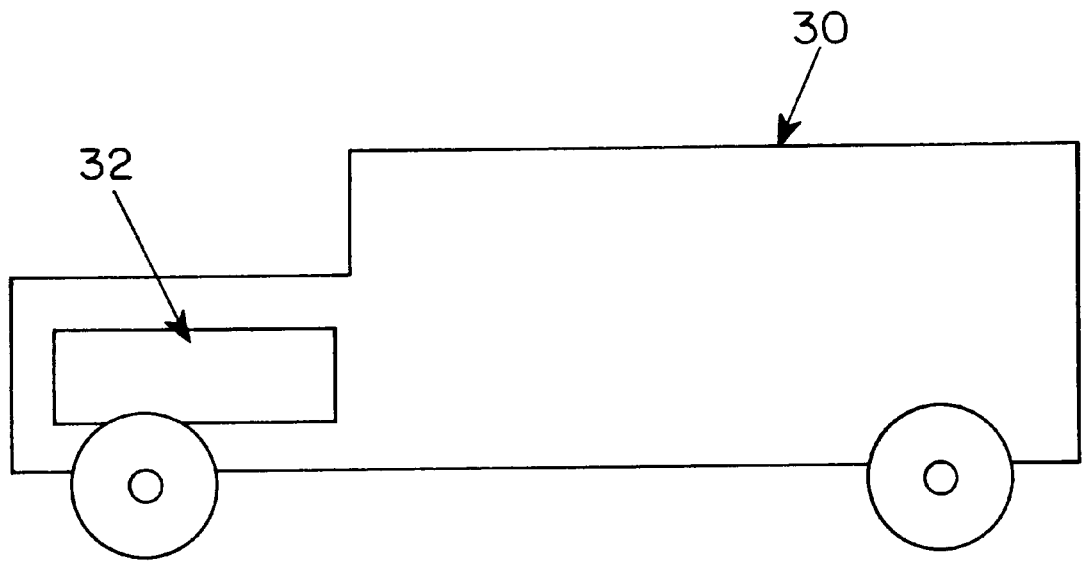
FIGS. 5 and 6 are schematic representations of a motor vehicle and a bicycle respectively containing a toothed belt or chain drive arrangement according to the invention.

For example, in a motor vehicle 30, schematically shown in FIG. 5, a toothed drive arrangement according to the invention may be used for a drive 32 connected to a crankshaft of a drive engine, for a synchronous drive of a drive unit, for a distributor fuel injection pump of a drive unit, for a transmission system, for a crankshaft drive of a drive unit or for a drive of a pump-nozzle direct fuel injection system or a high pressure pump for common rail high pressure fuel injection for a drive unit.

Although the invention has been described herein with referenced to specific embodiments, many modifications and variations therein will readily occur to those skilled in the art. Accordingly, all such variations and modifications are included within the intended scope of the invention.

I claim:

1. A toothed drive arrangement comprising:
   at least one toothed gear wheel having a plurality of tooth members; and
   at least one belt or chain having a plurality of tooth members engaging the gear wheel;
   wherein at least one selected tooth member on at least one of the toothed gear wheel and the toothed belt or chain has a flank geometry which differs from the flank geometry of other tooth members and;
   wherein the position of the at least one selected tooth member is arranged so that, at the moment of a load peak, upon run-in or run-out of engagement of a meshing tooth member and toothed belt or chain, the at least one selected tooth member is in engagement with the toothed belt or chain.

2. A toothed drive arrangement according to claim 1 wherein the flank geometry of front and rear flanks of the selected tooth members is asymmetrical.

3. A toothed drive arrangement according to claim 1 wherein the selected tooth member has a steeper flank geometry and/or a flatter flank geometry than the flank geometry of other tooth members of the pluralities of tooth members.

4. A toothed drive arrangement according to claim 1 wherein the selected tooth member is a tooth member of a toothed gear wheel and the position of the selected tooth member is arranged so that, at the moment of a load peak, the selected tooth member is in engagement with the belt or chain.

5. A toothed drive arrangement according to claim 1 wherein the selected tooth member has a head radius which is greater or less than that of other tooth members.

6. A toothed drive arrangement according to claim 1 wherein the position of the selected tooth member is arranged so that, at the moment of a load peak, the selected tooth member is at a run-in position or a run-out position of engagement with a toothed gear wheel.

7. A toothed drive arrangement according to claim 1 wherein the selected tooth member is on the toothed gear wheel and its position is arranged so that, at the moment of a load peak, the selected tooth member is at a run-in position or a run-out position of engagement with the belt or chain.

8. A toothed belt drive arrangement according to claim 1 wherein at least two selected tooth members of the belt or chain have a flank geometry differing from that of other tooth members and the selected tooth members are arranged so that, at the moment of a load peak, the selected tooth members are at a run-in position and/or a run-out position of engagement with at least one toothed gear wheel.

9. A toothed drive arrangement according to claim 1 wherein at least two selected tooth members of the toothed gear wheel have flank geometry differing from that of other tooth members and the selected tooth members are arranged so that the selected tooth members, at the moment of a load peak, are at a run-in position and/or run-out position of engagement with the belt or chain.

10. A toothed drive arrangement according to claim 1 wherein all of the tooth members have unlike flank geometries which are dependent upon a load applied to the tooth members around the periphery of the toothed gear wheel and/or of the belt or chain.

11. A toothed drive arrangement according to claim 1 including both a driving toothed gear wheel and a driven toothed gear wheel and including at least two selected tooth members having a flank geometry different from that of other tooth members, the selected tooth members being on both the driving toothed gear wheel and the driven toothed gear wheel or on corresponding regions of the belt or chain.

12. A toothed drive arrangement according to claim 11 wherein the selected tooth members are positioned with respect to the toothed gear wheels so that a variation in length of the belt or chain during operation and associated pitch errors over each of a plurality of flanks of tooth members are reduced to approximately zero.

13. A motor vehicle having a toothed drive arrangement according to claim 1 in a drive connected to a crankshaft of a drive unit in the motor vehicle.

14. A motor vehicle having a toothed drive arrangement according to claim 1 in a synchronous toothed belt drive in a drive of a drive unit in the motor vehicle.

15. A motor vehicle having a toothed drive arrangement according to claim 1 in a distributor injection pump of a drive unit in the motor vehicle.

16. A motor vehicle having a toothed drive arrangement according to claim 1 in a transmission system.

17. A motor vehicle having a toothed drive arrangement according to claim 1 in a camshaft drive of a drive unit in the motor vehicle.

18. A motor vehicle having a toothed drive arrangement according to claim 1 for a drive of a pump-nozzle direct fuel injection system or a high-pressure pump for common rail high-pressure fuel injection in a drive unit in the motor vehicle.

19. A bicycle having a toothed drive arrangement according to claim 1 in a drive unit in the bicycle.

* * * * *